(12) United States Patent
Kloepfer et al.

(10) Patent No.: US 8,313,095 B2
(45) Date of Patent: Nov. 20, 2012

(54) DEVICE FOR APPLYING PRESSURE TO A WORKPIECE AND CLAMPING TOOL

(75) Inventors: Gerhard Kloepfer, Pleidelsheim (DE); Karl Philipp, Bietigheim-Bissingen (DE); Hans Roesch, Gemmrigheim (DE)

(73) Assignee: BESSEY Tool GmbH & Co. KG, Bietigheim-Bissingen (DE)

( * ) Notice: Subject to any disclaimer, the term of this patent is extended or adjusted under 35 U.S.C. 154(b) by 1084 days.

(21) Appl. No.: 12/221,787

(22) Filed: Aug. 6, 2008

(65) Prior Publication Data

US 2009/0026681 A1 Jan. 29, 2009

Related U.S. Application Data

(63) Continuation of application No. PCT/EP2007/001149, filed on Feb. 10, 2007.

(30) Foreign Application Priority Data

Feb. 21, 2006 (DE) .................. 10 2006 008 871

(51) Int. Cl.
*B25B 1/00* (2006.01)
*B25B 1/02* (2006.01)
*B25B 5/02* (2006.01)
(52) U.S. Cl. .................. 269/143; 269/6; 269/166
(58) Field of Classification Search .................. 269/143, 269/6, 166, 215, 171.5
See application file for complete search history.

(56) References Cited

U.S. PATENT DOCUMENTS

| | | | | |
|---|---|---|---|---|
| 1,452,753 A | * | 4/1923 | Otto et al. | 269/189 |
| 1,659,342 A | * | 2/1928 | Wetzler | 269/166 |
| 1,689,331 A | * | 10/1928 | Disibio | 269/215 |
| 1,741,923 A | * | 12/1929 | Dohnal | 269/171.5 |
| 1,793,560 A | * | 2/1931 | Schmieder | 269/37 |
| 1,793,561 A | * | 2/1931 | Schmieder | 269/37 |
| 2,168,257 A | * | 8/1939 | Farmer | 269/171.5 |
| 2,675,839 A | * | 4/1954 | Beasley | 269/208 |
| 2,729,126 A | | 1/1956 | Stanton, Jr. et al. | |
| 2,845,828 A | | 8/1958 | Thomeczek | |
| 2,894,548 A | * | 7/1959 | Peck et al. | 269/258 |
| 3,052,462 A | | 9/1962 | Butler | |
| 3,151,897 A | * | 10/1964 | Wagner | 403/135 |
| 3,336,642 A | * | 8/1967 | Armacost | 24/523 |
| 4,034,971 A | * | 7/1977 | Tsuyama | 269/249 |
| 4,764,048 A | | 8/1988 | Kehl et al. | |

(Continued)

FOREIGN PATENT DOCUMENTS

DE 929 357 6/1955

(Continued)

*Primary Examiner* — Lee D Wilson
*Assistant Examiner* — Alvin Grant
(74) *Attorney, Agent, or Firm* — Lipsitz & McAllister, LLC

(57) ABSTRACT

A device for a clamping tool for applying pressure to a workpiece is provided, comprising a contacting area for a workpiece, a holding head locating space for a holding head of the clamping tool, and at least one locking element for fixing the holding head in the holding head locating space, which said locking element is arranged in a locking element locating space and must be passed through by the holding head, wherein the at least one locking element and the locking element locating space are formed in such a manner that the amount of force required to pass through the at least one locking element in the direction of insertion of the holding head into the holding head locating space is smaller than the amount of force required to pass therethrough in the direction of extraction of the holding head from the holding head locating space.

37 Claims, 4 Drawing Sheets

U.S. PATENT DOCUMENTS

| | | | |
|---|---|---|---|
| 4,802,700 A | | 2/1989 | Stevenson et al. |
| 4,874,155 A | * | 10/1989 | Goul .................................. 269/6 |
| 5,217,213 A | * | 6/1993 | Lii ..................................... 269/6 |
| 5,427,364 A | * | 6/1995 | Zborschil ....................... 269/166 |
| 6,113,089 A | * | 9/2000 | Kleinbongartz .............. 269/166 |
| 6,123,326 A | * | 9/2000 | Kleinbongartz .............. 269/215 |
| D467,152 S | * | 12/2002 | Wolff ............................... D8/72 |
| 6,971,641 B1 | * | 12/2005 | Sherwin ......................... 269/166 |
| 7,644,500 B2 | * | 1/2010 | Schmidt et al. .......... 29/898.044 |
| 2004/0046300 A1 | * | 3/2004 | Degen ........................... 269/166 |

FOREIGN PATENT DOCUMENTS

| | | |
|---|---|---|
| DE | 18 47 400 | 2/1962 |
| DE | 74 02 870 | 6/1974 |
| DE | 197 51 599 | 5/1999 |
| EP | 0 236 770 | 9/1987 |
| GB | 900 320 | 7/1962 |
| GB | 2 268 971 | 1/1994 |

* cited by examiner

DEVICE FOR APPLYING PRESSURE TO A WORKPIECE AND CLAMPING TOOL

This application is a continuation of international application number PCT/EP2007/001149 filed on Feb. 10, 2007.

The present disclosure relates to the subject matter disclosed in international application number PCT/EP2007/001149 of Feb. 10, 2007 and German application number 10 2006 008 871.9 of Feb. 21, 2006, which are incorporated herein by reference in their entirety and for all purposes.

BACKGROUND OF THE INVENTION

The invention relates to a device for a clamping tool for applying pressure to a workpiece.

Furthermore, the invention relates to a clamping tool.

An example of a clamping tool comprising a device for applying pressure to a workpiece is a screw clamp wherein a spindle acts upon a workpiece by means of a device for applying pressure to a workpiece.

From DE 18 47 400 U1, there is known a clamping device which has a pressure-exerting piece that ends in a ball. Furthermore, there is provided a pressure plate which is fixed in removable manner to the ball of the pressure-exerting piece. A spring is provided as the means for the removable attachment of the pressure plate.

From DE Patent 929 357, there is known a screw clamp comprising mounting devices which are arranged on the two pressure plates and are in the form of rotary bearings for exchangeable and rotatable pressure pads which serve as work-piece supports. The rotary bearings of these pressure pads are in the form of pushbutton bearings.

From DE 74 02 870 U1, there is known a clamping tool comprising a threaded spindle and a pressure cap. The pressure cap encloses a head of the threaded spindle with a foot-step bearing in positive manner. A spring or a snap ring forms the edge of the step bearing.

From DE 197 51 599 A1, there is known a screw cramp which has a pressure plate that is fixed on a threaded spindle in pivotal manner. The pressure plate can be aligned linearly by means of an adjusting device and arrest a spindle on an upper surface of a sliding arm.

From U.S. Pat. No. 3,052,462, there is known a C-clamp incorporating a screw, wherein the screw carries a ball head. A push button is seated on the ball head. This push button has a boring and a ring-like groove by means of which there is defined a lip which is connected by a neck to the rest of the body of the push button.

SUMMARY OF THE INVENTION

In accordance with the present invention, a device for applying pressure to a workpiece is provided, which is employable in varied manner.

In accordance with an embodiment of the invention, the device for applying pressure to a workpiece comprises a contacting area for contacting a workpiece, a holding head locating space for a holding head of the clamping tool, and at least one locking element for fixing the holding head in the holding head locating space, which said locking element is arranged in a locking element locating space and must be passed through by the holding head, wherein the at least one locking element and the locking element locating space are formed in such a manner that the amount of force required to pass through the at least one locking element in the direction of insertion of the holding head into the holding head locating space is smaller than the amount of force required to pass therethrough in the direction of extraction of the holding head from the holding head locating space.

In accordance with the invention, there is provided a device for applying pressure to a workpiece which can be seated on the holding head by exerting a certain amount of force, whereby this amount of force is smaller than the amount of force required for withdrawing the device for applying pressure to a workpiece.

By appropriate dimensioning of the locking element and the locking element locating space, the effect can be achieved that, for example, the device for applying pressure to a workpiece can be fixed in a simple manner during the process of manufacturing the clamping tool, whereby it is fixed in a secure manner and is thus prevented from being lost due to the fact that a large amount of force is required for removing it. By virtue of the solution in accordance with the invention, a device for applying pressure to a workpiece can also be made available which is removable in a simple manner but one which nevertheless can be fixed securely to the holding head. Removable devices for applying pressure to a workpieces are of significance when, for example, replacement of a device on which the holding head is seated has to be accomplished. An example of such a device is a spindle and in particular, a threaded spindle of a screw cramp.

The setting of the different amounts of force required for seating the device for applying pressure to a workpiece and for releasing the device for applying pressure to a workpiece is achieved in the case of the solution in accordance with the invention in a simple manner in that the locking element and the locking element locating space are formed in a mutually corresponding manner.

The solution in accordance with the invention can be employed in clamping tools by means of which pressure is applied to workpieces. For example, one envisaged form of employment is that of hand tools which are handheld and/or manually operated. The device for applying pressure to a workpiece in accordance with the invention can be used in clamping devices which comprise one or more clamping tools. For example, the device for applying pressure to a workpiece in accordance with the invention is used in vices or elbow lever clamps (toggle clamps); such toggle clamps can be in the form of hand tools and/or be integrated into a clamping device.

The contacting area of the device for applying pressure to a workpiece may have a flat contact surface or one or more non-flat contact surfaces which are matched to the special clamping tool and/or to the workpiece to which pressure is to be applied. For example, the contacting area may have a prismatic contact surface or a wedge-shaped contact surface. The contacting area can be rounded with a concave or a convex contact surface. It is also possible to have combinations of different types of contact surface. For example, it is also possible for the contacting area to be provided with one or more pointed elements.

In particular, the at least one locking element is arranged in the locking element locating space in captive manner in order to ensure simple manipulation of the arrangement.

It is expedient if the at least one locking element is configured as a ring. By virtue of such a ring-like locking element, the process of fixing a device for applying pressure to a workpiece to a holding head can be achieved in a simple manner. The ring-like locking element must be widened for the purposes of passing a holding head therethrough. To this end, an appropriate amount of force is required.

It is especially very advantageous if the at least one locking element is an open ring. This ring can be thus be expanded by appropriate dimensioning thereof and by exerting an appropriate amount of force.

It is especially very advantageous if, in the state wherein force is not applied thereto, the at least one locking element has an internal diameter (an inner surface) which is smaller than the largest external diameter of the holding head. After the holding head has passed through the locking element and the force is no longer effective, it is then secured in its holding head locating space by the locking element.

In particular, the at least one locking element is formed in resilient manner so that the internal diameter thereof is increasable in restorable manner by the application of force. It can thus be ensured that the holding head can be passed through the locking element in order to reach the position required for fixing the holding head in the device for applying pressure to a workpiece.

In particular, the at least one locking element is in the form of a snap ring and accordingly, the locking element locating space is in the form of snap ring groove.

Provision may be made for the holding head locating space to be formed such as to accommodate therein a holding head in the form of a ball head. When the holding head is in the form of a ball head, an optimised distribution of force can be achieved during the insertion of the holding head and/or the extraction of the holding head.

It is then expedient if the holding head locating space is rotationally symmetrical with respect to a longitudinal axis. Hereby, a symmetrical distribution of force can be achieved.

It is expedient if a longitudinal axis of the holding head locating space is oriented substantially perpendicularly to a contact surface of the contacting area for the workpiece. The device for applying pressure to a workpiece can thus be formed in a compact manner.

Preferably, the direction of insertion and/or the direction of extraction of the holding head into or out of the holding head locating space is parallel to or at a small angle to a longitudinal axis of the holding head locating space. It is thereby possible to cater for an optimally effective force for the insertion and the extraction processes in order to enable the device for applying pressure to a workpiece to be fixed to the holding head in a simple manner and thereby achieve secure fixing thereof.

It is expedient if the locking element locating space is formed on the holding head locating space. The effect can thereby be achieved in a simple manner that the holding head must pass through the locking element during the process of penetration into the holding head locating space.

For the same reason, it is expedient if an opening into the holding head locating space is formed on the locking element locating space.

It is especially very advantageous, if the locking element locating space is formed in such a manner that the at least one locking element is moveable therein in a direction parallel to a longitudinal direction of the holding head locating space. Thereby, different positions of the locking element in the locking element locating space can be made available whereat different forces for the expansion of the locking element for the passage of the holding head therethrough are necessary. Thereby in turn, the effect can be achieved that a smaller force is necessary for seating the device for applying pressure to a workpiece than is required for releasing it.

In particular, the locking element locating space has a first contacting area for the at least one locking element which is effective during the insertion of the holding head. The formation of the first contacting area then determines the amount of force that is required for the passage therethrough in the case of a given locking element.

Furthermore, the locking element locating space has a second contacting area for the at least one locking element which is effective during the extraction of the holding head. The effect can then be achieved that during the extraction process, the holding head guides the locking element into the second contacting area and holds it there. The forces necessary for the expansion thereof for the purposes of allowing the holding head to pass therethrough are then determined by the second contacting area in the case of a given locking element.

Expediently, the first contacting area and the second contacting area are spaced parallel to a longitudinal axis of the holding head locating space. The effect is thereby achieved that the at least one locking element can be pressed against the first contacting area or the second contacting area in dependence on the direction of motion of the holding head in the holding head locating space. In turn, the differing amounts of force required can be set by appropriate formation of these contacting areas.

In particular, the second contacting area is located before the first contacting area taken with reference to the direction of insertion of the holding head into the holding head locating space. For the purposes of insertion of the holding head, the effect can thereby be achieved that the locking element rests on a substantially flat contact surface in the first contacting area so that the amount of force that is required for the expansion of the locking element is minimized.

In particular, the amount of force required for opening the at least one locking element when the latter is in the first contacting area is smaller than the amount of force required when it is in the second contacting area, wherein the amount of force is taken with reference to a longitudinal axis of the holding head locating space. The effect can thereby be achieved in a simple manner that the device for applying pressure to a workpiece is fixable to the holding head with just a small amount of force and must be released therefrom with a larger amount of force.

In particular, a force re-directing device and/or a force buffering device is provided in the second contacting area. The effect is thereby achieved that, for an equal effective axial force and compared with the first contacting area, a smaller force is available for opening the locking element. This means that when the second locking element is located in the second contacting area, a larger axial force must be made available in order to provide for the necessary expansion of the locking element if the holding head is to be passed therethrough.

It is expedient if the holding head locating space has a greater diameter in the region of the locking element locating space. The effect can thereby be achieved that the side walls of the locking element locating space do not substantially affect the expansion of the locking element when being penetrated in the direction of insertion.

For the same reason, it is expedient if the holding head locating space has its greatest diameter in the first contacting area.

Passage of the holding head into the holding head locating space during the insertion thereof can be achieved with a relatively small amount of force, if the locking element locating space and the locking element are formed in such a manner that the locking element does not touch a side wall of the locking element locating space when located in the first contacting area over a peripheral range which amounts to at least 15% of the total periphery of the side wall in the first contacting area. Thus, an expansion of the locking element can be achieved which is substantially determined only by the resilient deformability of the locking element so that the side wall does not affect its expansibility.

Expediently, the first contacting area has a contact surface which is oriented substantially perpendicularly to the longitudinal axis of the holding head locating space. Thus, a thrust force, by means of which the device for applying pressure to a workpiece is seated on the holding head, can be converted into an expansion of the locking element in an optimal manner.

In one advantageous embodiment, the locking element locating space has a side wall in the second contacting area which is oriented at an acute angle to the longitudinal axis of the holding head locating space. Thus, a device for re-directing the force can be provided in a simple manner in order to cater for a reduced force effective for the expansion of the locking element being made available in the second contacting area. In turn, this means that a greater total force must be provided in order to enable the holding head to be withdrawn from the holding head locating space. Thus again, the device for applying pressure to a workpiece is fixed to the holding head in a secure manner.

In particular, the second contacting area has a contact surface which is oriented at an acute angle to the longitudinal axis of the holding head locating space. The effect can thereby be achieved in a simple manner that, in the case of a correspondingly effective tensile force for the relative separating movement of the device for applying pressure to a workpiece and the holding head, a relatively small force is available for the expansion of the locking element.

For the same reason, it is expedient if the second contacting area has a contact surface which is oriented at an acute angle to a contact surface of the first contacting area.

In particular, the acute angle lies in a range of between 30° and 70°.

It is expedient if the second contacting area is formed in such a manner that, when the at least one locking element is located in the second contacting area, the holding head abuts against the at least one locking element and outward movement thereof is blocked without an additional amount of force.

Expediently, for the purposes of passing through the at least one locking element, the holding head must expand the at least one locking element when the at least one locking element is located in the first contacting area or the second contacting area.

It is expedient if provision is made for the holding head to be adapted to be removed and in particular, is adapted to be manually removed. For example, the dimensioning is effected in such a manner that the device for applying pressure to a workpiece is manually removable, in that a threaded spindle is rotated and the device for applying pressure to a workpiece thereby pushes against a thread guidance device of the threaded spindle.

The device for applying pressure to a workpiece is designed, in particular, as a pressure cap. This is advantageously formed in one piece with the locking element. This pressure cap can be manufactured in a simple manner. For example, it is manufactured by shaping techniques.

Furthermore, in accordance with the present invention, a clamping tool is provided, which can be manufactured in a simple manner or which can be used in various ways.

In accordance with an embodiment of the invention, the clamping tool is provided with at least one device for applying pressure to a workpiece in accordance with the invention.

Such a clamping tool can be manufactured in a simple manner since it can be provided with a device for applying pressure to a workpiece in a simple manner. This is also removable by exerting an appropriate amount of force so that for example, a spindle is exchangeable in a simple manner.

In particular, the clamping tool in accordance with the invention comprises a spindle which is provided with a holding head. A thrust force is exerted via this spindle, whereby the device for applying pressure to a workpiece provides a contact surface for the workpiece.

Provision may be made for the holding head to be in the form of a ball head. Such a ball head can be manufactured in a simple manner. The device for applying pressure to a workpiece can also then be manufactured in a simple manner.

The clamping tool is for example, a hand tool such as a cramp (such as a screw cramp for example).

The following description of preferred embodiments serves for a more detailed explanation of the invention taken in conjunction with the drawings.

DETAILED DESCRIPTION OF THE INVENTION

Figure 1:
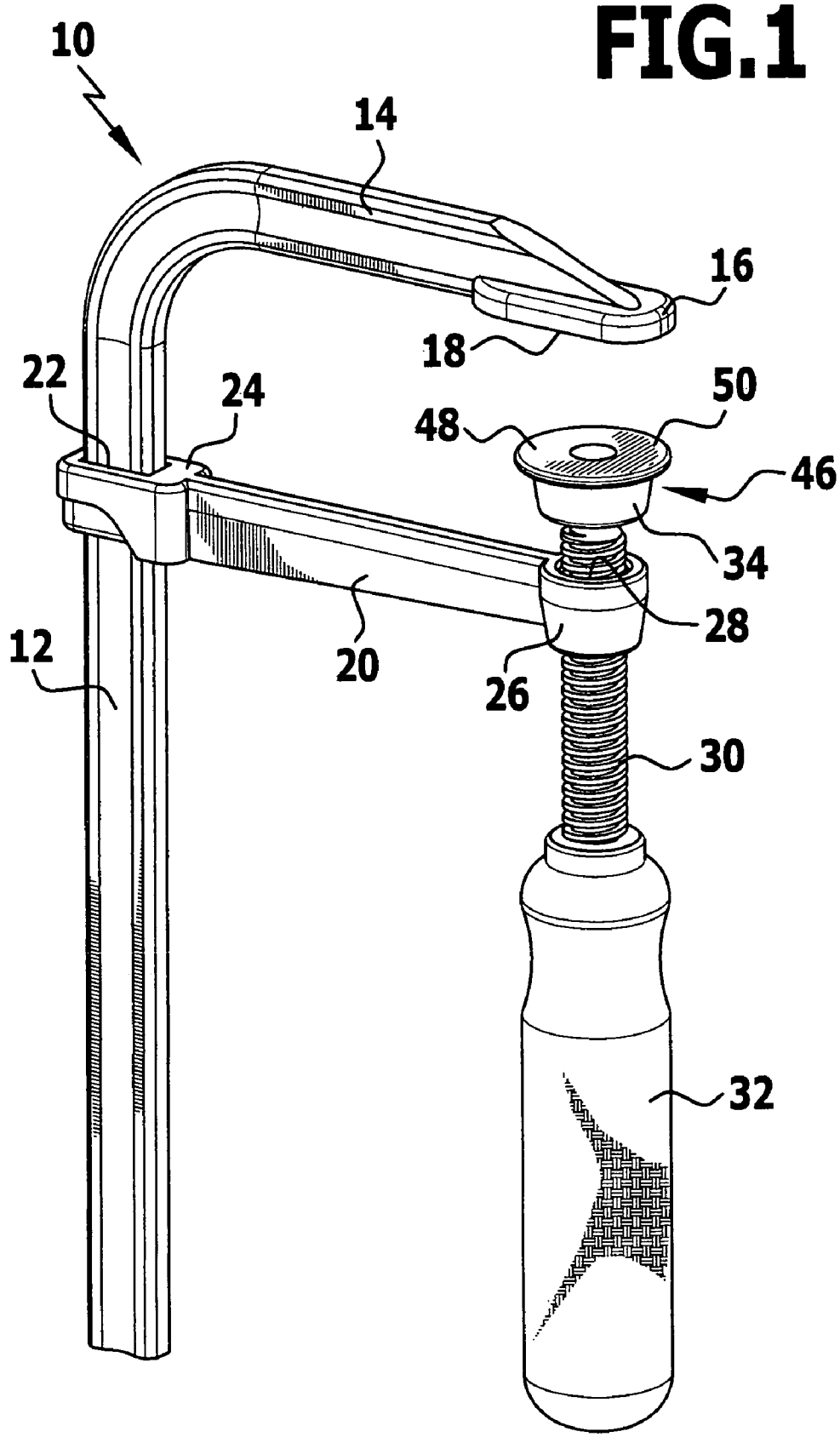
FIG. 1 shows a perspective illustration of an exemplary embodiment of a clamping tool which is provided with an embodiment of a device for applying pressure to a workpiece in accordance with the invention.

An exemplary embodiment of a clamping tool which bears the general reference 10 and is shown in FIG. 1 is a screw cramp (screw clamp). The screw cramp 10 is a hand tool and comprises a rail 12 on which a fixed clamping arm 14 is arranged. The fixed clamping arm 14 has a contacting area 16 for contacting a workpiece. This contacting area 16 has a substantially flat contact surface 18.

A sliding arm 20 is guided on the rail 12. The sliding arm 20 comprises a recess 22 which is formed on a retaining element 24. The sliding arm 20 is guided on the rail 12 by the retaining element 24. Here, the retaining element 24 is formed in such a way that it can tilt on the rail 12.

The fixed clamping arm 14 and the sliding arm 20 are aligned at least approximately parallel to each other.

The sliding arm 20 comprises a threaded element 26 having an internal thread 28 at the opposite end thereof to the retaining element 24. A threaded spindle 30 is guided in the internal thread 28. A handle element 32 is seated on the threaded spindle 30.

The threaded spindle 30 has a holding head 34 at the opposite end thereof to the handle element 32 (FIGS. 2 and 3) which, in particular, is in the form of a ball head 36. The threaded spindle 30 extends along an axis 38 which is coaxial with an axis of rotation of the threaded spindle 30. A centre point 40 of the ball head 36 lies on the axis 38.

The ball head 36 has a substantially flat end face 42 in the exemplary embodiment shown, so that it is in the form of a segment of a sphere in this region.

The diameter of the ball head 36 is smaller than the diameter of the threaded spindle 30 (in each case taken with reference to a direction perpendicular to the axis 38). The diameter becomes greater at a transition region 44 between the ball head 36 and the remaining part of the threaded spindle 30.

A device for applying pressure to a workpiece 46 which is, in particular, manually removable is arranged on the holding head 34. It has a contacting area 48 the contact surface 50 of which is adapted to be placed on a workpiece. The contact surface 50 is substantially flat. It is aligned with the contact surface 18 of the fixed clamping arm 14.

The threaded spindle 30 can exert a thrust force on a workpiece having a side thereof resting against the fixed clamping arm 14.

The device for applying pressure to a workpiece 46 is removable in order to enable the spindle to be exchanged in a simple manner for example.

The device for applying pressure to a workpiece 46 has an end plate 52 on which the contacting area 48 together with its contact surface 50 is formed. The end plate 52 is in the form of a circular disk for example.

A retaining element 56, by means of which the device for applying pressure to a workpiece 46 is held on the holding head 34, is seated on the end plate 52 and is set-back with respect to an outer edge 54 of the end plate 52. The end plate 52 and the retaining element 56 are formed, in particular, in one piece manner.

Figure 2:
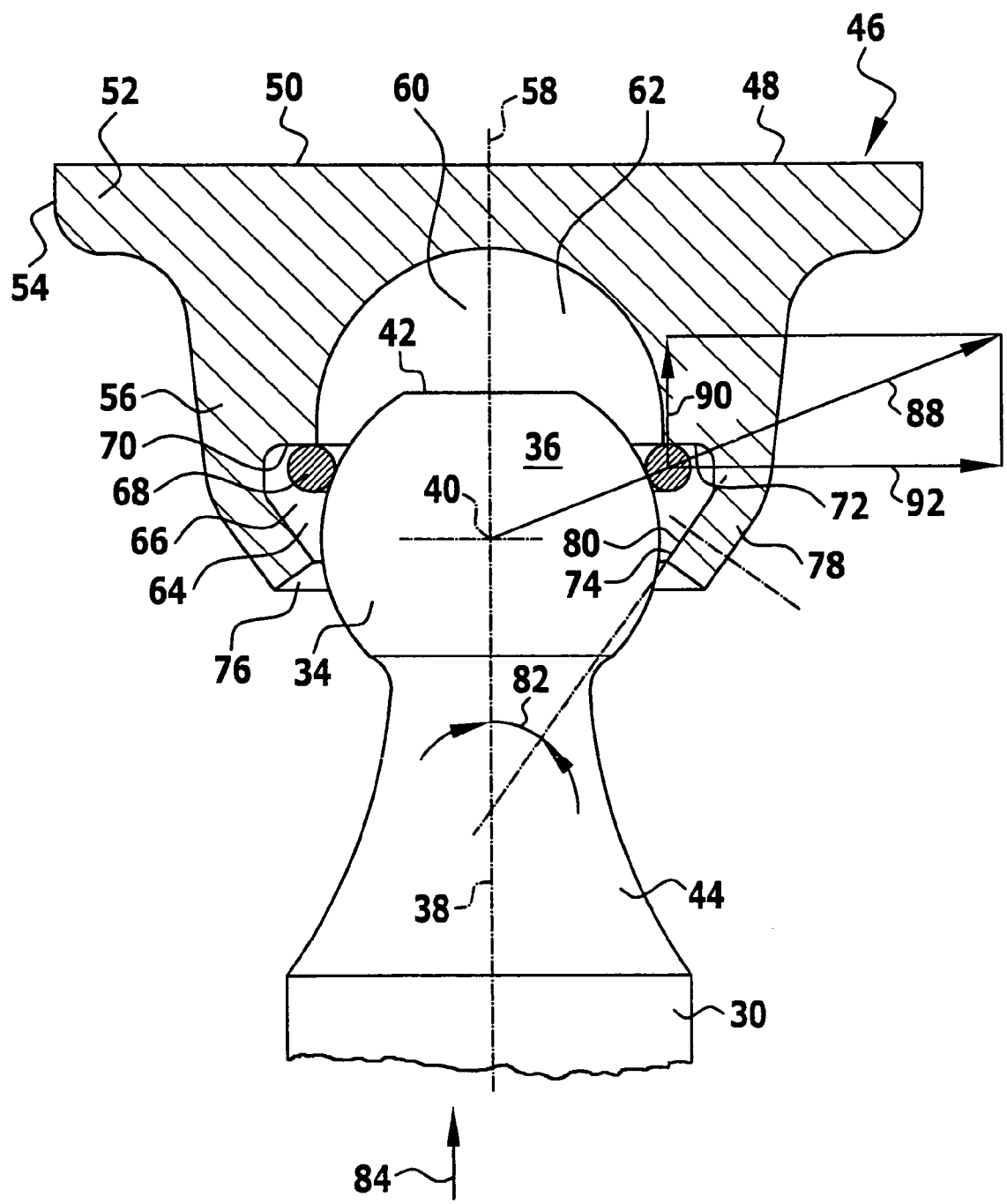
FIG. 2 shows a sectional side view of an exemplary embodiment of a device for applying pressure to a workpiece in accordance with the invention in an intermediary state when inserting a holding head.
Figure 3:
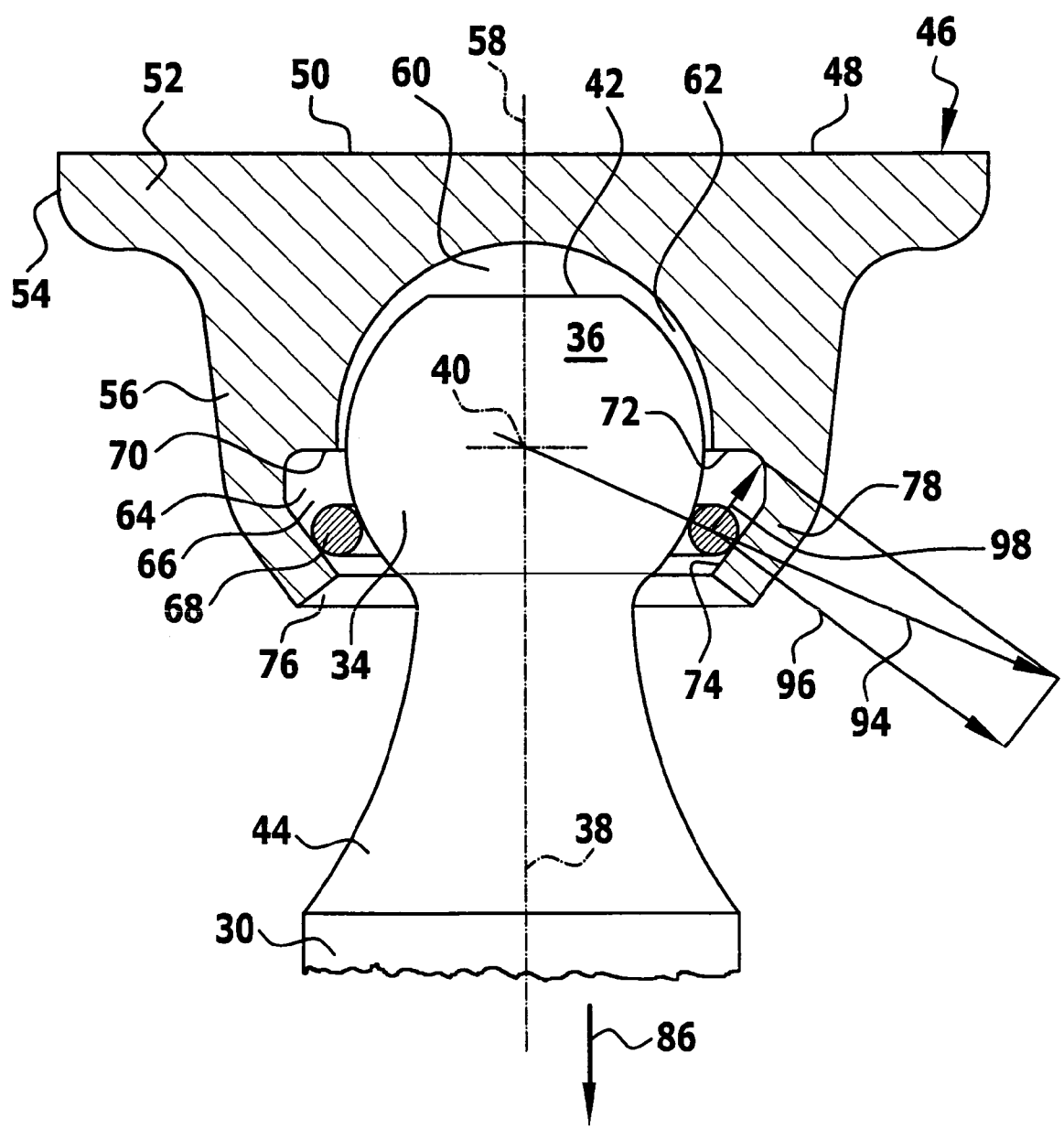
FIG. 3 shows the device for applying pressure to a workpiece in accordance with FIG. 2 in an intermediary state when extracting the holding head.

The retaining element 56 and the end plate 52 are, in particular, rotationally symmetrical with respect to a longitudinal axis 58. In FIGS. 2 and 3, there are shown positions whereat the axis 38 of the threaded spindle 30 and the longitudinal axis 58 of the device for applying pressure to a workpiece 46 are aligned coaxially to each other.

The retaining element 56 comprises a holding head locating space 60 in which the holding head 34 is positionable. The holding head locating space 60 has a first region 62 which takes the form of a hollow ball section. For example, it is in the form of a hollow hemispherical section.

Figure 4:
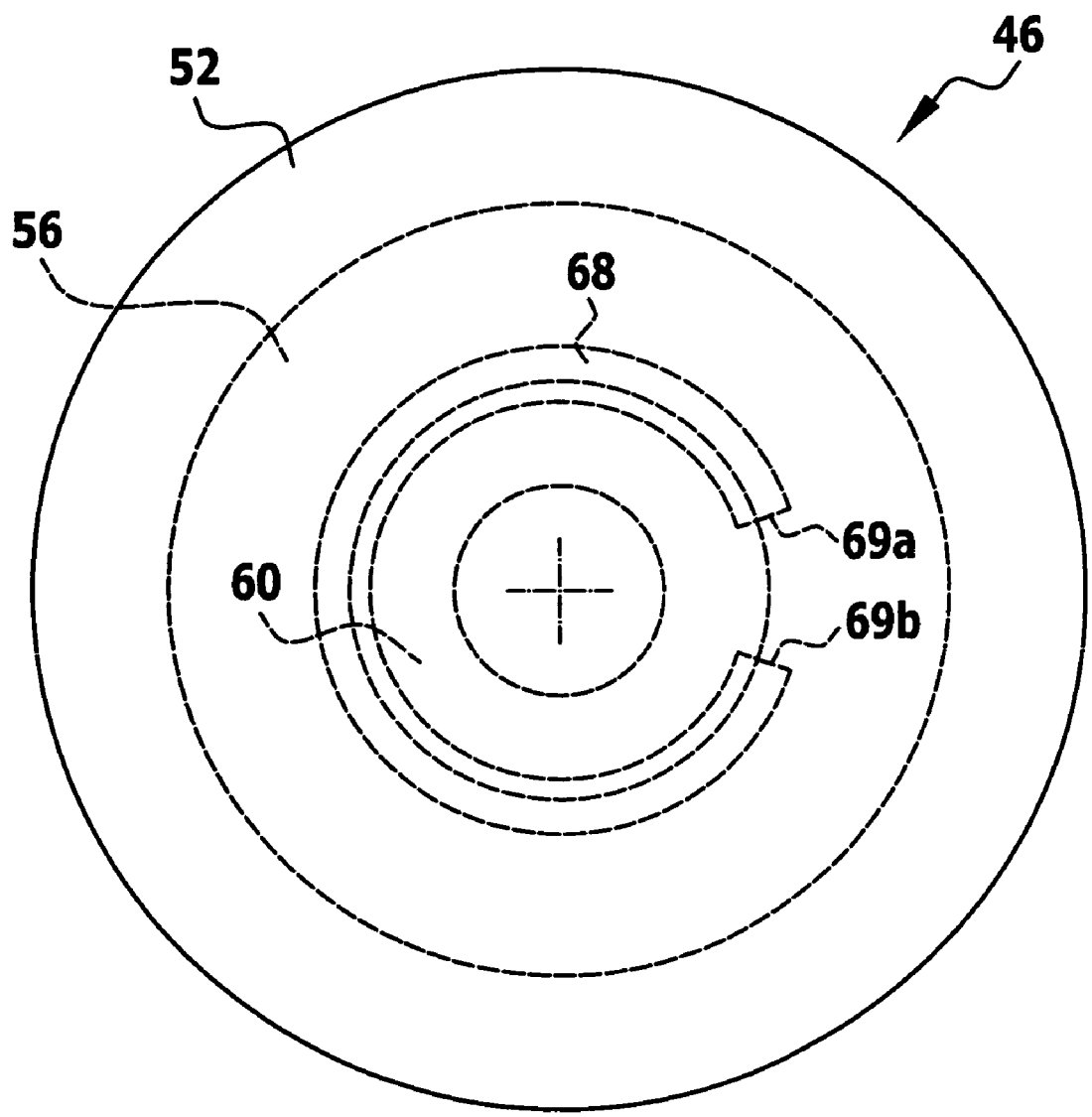
FIG. 4 shows a plan view of the device for applying pressure to a workpiece in accordance with FIG. 2.

A second region 64, in which a locking element locating space 66 is formed, follows upon the first region 62 of the holding head locating space 60. A ring-like locking element 68 is positioned in the locking element locating space 66 (FIGS. 2 to 4).

The locking element 68 is open, i.e. it has end faces 69a, 69b and it is not a closed ring. In particular, the locking element 68 is in the form of a snap ring. Accordingly, the locking element locating space 66 is in the form of a snap ring groove. It is made of a resilient material so that its internal diameter and thus its aperture are increasable in restorable manner by the application of force.

The locking element locating space 66 has a first contacting area 70 for the locking element 68. A contact surface of this first contacting area 70 is oriented substantially perpendicularly to the longitudinal axis 58 (i.e. a surface-normal of this contact surface lies parallel to the longitudinal axis 58). The first contacting area 70 is formed at the transition from the first region 62 of the holding head locating space to the second region 64. The holding head locating space 60 is, for example, in the form of a hollow cylinder at the first contacting area 70, wherein the corresponding hollow cylinder has a diameter perpendicular to the longitudinal axis 58 which is greater than the diameter of the first region 62 perpendicular to the longitudinal axis 58. A ring-like shoulder 72 is thereby provided in order to form the contact surface for the first contacting area 70.

Furthermore, the locking element locating space 66 has a second contacting area 74 which is spaced relative to the first contacting area 70. The second contacting area 74 is formed at a region of the holding head locating space 60 which for example, has the shape of a hollow cone section having an (imaginary) cone tip which lies on the longitudinal axis 58.

An opening 76 from the holding head locating space 60 thereby opens into this region in the form of a hollow cone section and thus into the locking element locating space 66. It is bounded by a side wall 78 which forms the second contacting area 74. An annular contact surface 80 of the second contacting area 74 is thereby oriented at an acute angle 82 to the longitudinal axis 58.

This acute angle, which corresponds to the cone angle of the region of the holding head locating space 60 in the form of a hollow cone section, is in the order of magnitude of between 20° and 70° for example.

The locking element 68 is held in the locking element locating space 66 in captive manner by the side wall 78. Its movement in the direction of insertion 84 of the holding head 34 into the holding head locating space 60 (FIG. 2) is blocked by the first contacting area 70.

In order to enable the holding head 34 to completely enter into the holding head locating space 60, it must pass through the ring-like locking element 68. In the course of inserting the holding head 34 into the holding head locating space 60, the locking element 68 is pressed against the first contacting area 70 by the holding head 34. Without the exertion of force, an internal diameter of the locking element 68 is thereby smaller than the largest diameter (ball diameter) of the holding head 34. In order to enable the holding head 34 to pass through the locking element 68, its internal diameter must be increased by using an appropriate amount of force. This is effected by the resilient bending of the locking element 68.

By exerting a force, the locking element 68 is pushed open so that the holding head 34 can be passed through it. A situation prior to the forced opening of the locking element 68 is shown in FIG. 2.

The locking element locating space 66 around the first contacting area 70 is formed in such a way that expansion of the locking element 68 is possible to the extent that the holding head 34 can pass therethrough. In particular, the locking element 68 is formed in such a way that, for at least 15% of the total periphery of a side wall in the first contacting area 70 is not touched by the locking element 68; sufficient space is thereby made available for the opening of the locking element 68.

When the holding head 34 is fully inserted into the holding head locating space 60, it is then prevented from being removed by the locking element 68. After the passage of the holding head 34, the locking element 68 reverts to its blocking state in which passage therethrough is prevented and the device for applying pressure to a workpiece 46 is thus fixed to the spindle 30.

The locking element 68 is moveable parallel to the longitudinal axis 58 in the locking element locating space 66 between the first contacting area 70 and the second contacting area 74.

In order to extract the device for applying pressure to a workpiece 46, the holding head 34 must be guided out from the holding head locating space 66 in the direction of extraction 86. This, for example, is effected in such a manner that the threaded spindle 30 is rotated back until the device for applying pressure to a workpiece 46 touches the threaded element 26. The necessary force required for extracting the holding head 34 is produced by further rotation.

In accordance with the invention, provision is made for the force that is required for inserting the holding head 34 in the insertion direction 84 to be smaller, and in fact considerably smaller, than the force required for withdrawing the holding head 34 in the direction of extraction 86. For the purposes of inserting the holding head 34 into the holding head locating space 60, the resilient force for the expansion of the locking element 68 must be overcome. This is achieved in that the locking element 68 is located in the first contacting area 70 and thereby, sufficient free space is present between the locking element 68 and a corresponding side wall as to enable such an expansion to occur.

In FIG. 2, the forces which are effective on the locking element 68 when the holding head 34 is pushed-in in the insertion direction 84 are shown schematically. Due to the ball-like shape of the holding head 34, a radial force 88 that is oriented radially with respect to the ball head 36 is effective on the locking element 68. This force can be resolved into a normal component 90 which is normal to the contact surface of the first contacting area 70 and into a transverse component 92. The transverse component 92 causes an expansion of the locking element 68 such as to allow the holding head 34 to pass through. In the course of the expansion of the locking element 68, a frictional force, which is determined by the normal component 90, has to be overcome.

During the relative movement apart of the device for applying pressure to a workpiece 46 and the holding head 34, the latter carries the locking element 68 along with it until it rests against the contact surface 80 of the second contacting area 74.

When the locking element 68 is located in the second contacting area 74 (FIG. 3), then a radial force 94 is exerted on the locking element 68 during the process of feeding out the holding head 34 in the direction of extraction 86. This radial force 94 can be resolved into a normal component 96 and a transverse component 98. Due to the inclined side wall 78, there is a redirection of the force. If this wall is sufficiently rigid, then expansion of the locking element 68 in a direction parallel to the normal component 96 is not possible. Expansion is only possible in a direction parallel to the transverse component 98. The transverse component 98 is relatively small compared with the transverse component 92. Furthermore, the normal force component 96, which determines the frictional force during the expansion process, is relatively high. This means that a high radial force 94 and thus a pulling force must be applied in the direction 86 in order to enable the locking element 68 to be opened wide enough for the holding head 34 to be capable of being passed therethrough. This pulling force is substantially higher than the thrust force which is necessary for pressing the holding head 34 through the locking element 68 into the holding head locating space 60 in the direction of insertion 84.

In consequence, a considerably greater amount of force is required in order to guide the holding head 34 through the locking element 68 in the direction of extraction 86, whereas the amount of force required for guiding the holding head 34 through the locking element 68 in the direction of insertion 84 is smaller.

This enables the hand tool 10 to be fabricated in a simple manner since the device for applying pressure to a workpiece can be placed on the threaded spindle 30 with only a small amount of force. For releasing it however, a greater amount of force is necessary.

In accordance with the invention, there is provided a clamping tool 10 (such as a manually actuated cramp) comprising a removable device for applying pressure to a workpiece 46. The device for applying pressure to a workpiece 46 can be released from the holding head 34 with an appropriate amount of force, whereby however, it is fixable to the holding head 34 in a simple manner. Thus the device for applying pressure to a workpiece 46 can be exchanged in a simple manner. By appropriate dimensioning of the device for applying pressure to a workpiece 46, it can also be manually removed.

In particular, the device for applying pressure to a workpiece 46 is in the form of a pressure cap. It is manufactured by a shaping process for example. The side wall 78 can be manufactured by a cold-pressing process for example.

The end plate 52 and the retaining element 56 are connected together, in particular, in one piece manner. For example, they are made of a metallic material. The locking element 68 is likewise preferably made of a metallic material. Provision may be made for a protective cap consisting for example of a synthetic material to be seated on the end plate 52 (not shown in the drawing).

It is in principle also possible for a plurality of locking elements to be positioned in the locking element locating space 66.

The locking element 68 has two especial positions in the locking element locating space 66, these being specified by the first contacting area 70 and the second contacting area 74. In these two positions, the forces that are relevant for the expansion of the locking element 68 (for the passage therethrough of the holding head 34) act in different ways. The effect is thereby achieved that the through passage of the holding head 34 in the insertion direction 84 requires a (considerably) lesser amount of force than for passing it through in the direction of extraction 86.

In the exemplary embodiment described above, the different ways for applying the force result from the inclined side wall 78 which causes the force to be redirected.

It is alternatively or additionally possible for a force buffering means to be effective on the second contacting area, this means ensuring that only a part of the total effective force goes into the expansion of the locking element 68. The remaining part of the force is taken up by the force buffering means. This force buffering means is not effective on the first contacting area. Such a force buffering means can, for example, be produced in that the side wall is formed in a resilient manner in the region of the first contacting area.

The invention claimed is:

1. Device for a clamping tool for applying pressure to a workpiece, comprising:
    a contacting area for a workpiece;
    a holding head locating space for a holding head of the clamping tool; and
    at least one locking element for fixing the holding head in the holding head locating space, the at least one locking element being arranged in a locking element locating space and the at least one locking element being passed through by the holding head;
    wherein:
        the at least one locking element and the locking element locating space are formed in such a manner that an amount of force required to pass through the at least one locking element in a direction of insertion of the holding head into the holding head locating space is smaller than an amount of force required to pass therethrough in the direction of extraction of the holding head from the holding head locating space;
        the locking element locating space has a first contacting area for the at least one locking element which is effective during the insertion of the holding head; and
        the locking element locating space has a second contacting area for the at least one locking element which is effective during the extraction of the holding head.

2. Device for applying pressure to a workpiece in accordance with claim 1, wherein the at least one locking element is arranged captively in the locking element locating space.

3. Device for applying pressure to a workpiece in accordance with claim 1, wherein the at least one locking element is configured as a ring.

4. Device for applying pressure to a workpiece in accordance with claim 3, wherein the at least one locking element is an open ring.

5. Device for applying pressure to a workpiece in accordance with claim 1, wherein, in a state wherein force is not applied thereto, the at least one locking element has an internal diameter which is smaller than a largest external diameter of the holding head.

6. Device for applying pressure to a workpiece in accordance with claim 1, wherein the at least one locking element is configured to be resilient so that its internal diameter is increasable in a restorable manner by the application of force.

7. Device for applying pressure to a workpiece in accordance with claim 1, wherein the locking element is adapted to be passed-through by an exertion of force by means of the holding head.

8. Device for applying pressure to a workpiece in accordance with claim 1, wherein the at least one locking element is in a form of a snap ring.

9. Device for applying pressure to a workpiece in accordance with claim 8, wherein the locking element locating space is in a form of a snap ring groove.

10. Device for applying pressure to a workpiece in accordance with claim 1, wherein the holding head locating space is formed for locating therein the holding head in the form of a ball head.

11. Device for applying pressure to a workpiece in accordance with claim 1, wherein the holding head locating space is rotationally symmetrical with respect to a longitudinal axis.

12. Device for applying pressure to a workpiece in accordance with claim 1, wherein the locking element locating space is rotationally symmetrical with respect to a longitudinal axis.

13. Device for applying pressure to a workpiece in accordance with claim 1, wherein a longitudinal axis of the holding head locating space is oriented substantially perpendicularly to a contact surface of the contacting area for the work piece.

14. Device for applying pressure to a workpiece in accordance with claim 1, wherein a direction of insertion of the holding head into the holding head locating space is parallel to or at a small angle to a longitudinal axis of the holding head locating space.

15. Device for applying pressure to a workpiece in accordance with claim 1, wherein a direction of extraction of the holding head from the holding head locating space is parallel to or at a small angle to a longitudinal axis of the holding head locating space.

16. Device for applying pressure to a workpiece in accordance with claim 1, wherein the locking element locating space is formed on the holding head locating space.

17. Device for applying pressure to a workpiece in accordance with claim 1, wherein an opening into the holding head locating space is formed on the locking element locating space.

18. Device for applying pressure to a workpiece in accordance with claim 1, wherein the locking element locating space is formed in such a manner that the at least one locking element is moveable therein in a direction parallel to a longitudinal axis of the holding head locating space.

19. Device for applying pressure to a workpiece in accordance with claim 1, wherein the first contacting area and the second contacting area are spaced parallel to a longitudinal axis of the holding head locating space.

20. Device for applying pressure to a workpiece in accordance with claim 1, wherein the second contacting area is located in front of the first contacting area taken with reference to the direction of insertion of the holding head into the holding head locating space.

21. Device for applying pressure to a workpiece in accordance with claim 1, wherein the force required for opening the at least one locking element when the at least one locking element abuts the first contacting area is smaller than the force required for opening the at least one locking element when the at least one locking element abuts the second contacting area, wherein the amount of force is taken with reference to a longitudinal axis of the holding head locating space.

22. Device for applying pressure to a workpiece in accordance with claim 21, wherein at least one of a force re-directing device and a force buffering device is provided in the second contacting area.

23. Device for applying pressure to a workpiece in accordance with claim 1, wherein the holding head locating space has a greatest diameter in a region of the locking element locating space.

24. Device for applying pressure to a workpiece in accordance with claim 1, wherein the holding head locating space has a greatest diameter in the first contacting area.

25. Device for applying pressure to a workpiece in accordance with claim 1, wherein the locking element locating space and the locking element are formed in such a manner that, when located in the first contacting area, the locking element does not touch a side wall of the locking element locating space over a peripheral range which amounts to at least 15% of a total periphery of the side wall in the first contacting area.

26. Device for applying pressure to a workpiece in accordance with claim 1, wherein the first contacting area has a contact surface which is oriented substantially perpendicularly to a longitudinal axis of the holding head locating space.

27. Device for applying pressure to a workpiece in accordance with claim 1, wherein the locking element locating space has a side wall in the second contacting area which is oriented at an acute angle to a longitudinal axis of the holding head locating space.

28. Device for applying pressure to a workpiece in accordance with claim 1, wherein the second contacting area has a contact surface which is oriented at an acute angle to a longitudinal axis of the holding head locating space.

29. Device for applying pressure to a workpiece in accordance with claim 1, wherein the second contacting area has a contact surface which is oriented at an acute angle to a contact surface of the first contacting area.

30. Device for applying pressure to a workpiece in accordance with claim 27, wherein the acute angle lies in a range of between 30° and 70°.

31. Device for applying pressure to a workpiece in accordance with claim 1, wherein the second contacting area is formed in such a manner that, when the at least one locking element abuts the second contacting area, the holding head rests against the at least one locking element and outward movement of the holding head is blocked without an additional amount of force.

32. Device for applying pressure to a workpiece in accordance with claim 1, wherein, for the purposes of passing through the at least one locking element, the holding head must expand the at least one locking element when the at least one locking element is located in the first contacting area or in the second contacting area.

33. Device for applying pressure to a workpiece in accordance with claim 1, wherein the holding head is adapted to be removed.

34. Device for applying pressure to a workpiece in accordance with claim 1, wherein the device for applying pressure to a workpiece is in the form of a pressure cap.

35. Clamping tool, comprising:

a holding head; and at least one device for applying pressure to a workpiece, said device comprising:

a contacting area for a workpiece;

a holding head locating space for the holding head of the clamping tool; and at least one locking element for fixing the holding head in the holding head locating space, the at least one locking element being arranged in a locking element locating space and the at least one locking element being passed through by the holding head;

wherein:

the at least one locking element and the locking element locating space are formed in such a manner that an amount of force required to pass through the at least one locking element in a direction of insertion of the holding head into the holding head locating space is smaller than an amount of force required to pass therethrough in the direction of extraction of the holding head from the holding head locating space;

the locking element locating space has a first contacting area for the at least one locking element which is effective during the insertion of the holding head; and the locking element locating space has a second contacting area for the at least one locking element which is effective during the extraction of the holding head.

36. Clamping tool in accordance with claim 35, wherein at least one spindle is provided with the holding head.

37. Clamping tool in accordance with claim 36, wherein the holding head is in a form of a ball head.

* * * * *